United States Patent [19]
Ozaki et al.

[11] Patent Number: 5,752,391
[45] Date of Patent: May 19, 1998

[54] REFRIGERATING SYSTEM

[75] Inventors: Yukikatsu Ozaki; Masaru Tsunokawa, both of Nishio; Takahisa Suzuki, Kariya; Toshihiro Nagata, Tokoname; Mitsuo Inagaki; Sadahisa Onimaru, both of Nishio, all of Japan

[73] Assignee: Nippon Soken, Inc., Japan

[21] Appl. No.: 787,374

[22] Filed: Jan. 22, 1997

[30] Foreign Application Priority Data

Jan. 23, 1996 [JP] Japan ................ 8-009539

[51] Int. Cl.$^6$ ........................ F25B 1/00
[52] U.S. Cl. ............ 62/228.1; 62/228.3; 62/228.5; 62/208
[58] Field of Search ............ 62/197, 208, 217, 62/226, 228.1, 228.3, 228.5, 196.1, 216

[56] References Cited

U.S. PATENT DOCUMENTS

| | | | |
|---|---|---|---|
| 3,564,865 | 2/1971 | Spencer et al. | 62/197 |
| 3,795,117 | 3/1974 | Moody et al. | 62/197 |
| 4,344,297 | 8/1982 | Ueno et al. | 62/228.1 |
| 4,364,714 | 12/1982 | Zimmern | 417/53 |
| 4,562,700 | 1/1986 | Atsumi et al. | 62/174 |
| 4,648,814 | 3/1987 | Shibayashi | 418/55 |

FOREIGN PATENT DOCUMENTS

| | | |
|---|---|---|
| 55-72062 | 5/1980 | Japan. |
| 61-1658 | 1/1986 | Japan. |

*Primary Examiner*—William Doerrler
*Attorney, Agent, or Firm*—Cushman Darby & Cushman Intellectual Property Group of Pillsbury Madison & Sutro, LLP

[57] ABSTRACT

A refrigerating system of a gas injection type having first and second stage pressure reducers 3 and 5, between which a separator 4 is arranged, and a conduit 10 for introduction of a gaseous refrigerant separated at a separator 4 into a compressor 1. A by-pass conduit 11 is connected to a refrigerating system so that the second stage pressure reducer 5 is by-passed. An ON-OFF control valve 12 is arranged in the by-pass conduit. The control valve 12 is switched to an opened condition during a low load of the air conditioning system, which makes a pressure difference low between the outlet of the separator 4 and an evaporator 6, which prevent gas injection from being executed.

A control valve can also be arranged in a gas injection conduit 10, which controls an amount of the gas injection in accordance with a ratio (compression ratio) of an outlet pressure to an intake pressure in such a manner a reduction of a gas injection amount is obtained when a value of the compression ratio is lower than a predetermined value, thereby preventing over-compression from occurring.

5 Claims, 16 Drawing Sheets

ROTATING SPEED OF COMPRESSOR (rpm)

REFRIGERATING SYSTEM

BACKGROUND OF THE INVENTION

1. Field of the Invention

The present invention relates to a refrigerating system which is suitably used for a refrigerating apparatus for an electric car.

2. Description of Related Art

In an electric car, an air conditioning apparatus is usually provided with an electric motor for obtaining a rotating movement to be applied to a compressor located in a refrigerating system for the air conditioning apparatus. The electric motor is fed by a battery by which an electric motor for obtaining a rotating movement of wheels of the car is also fed. Thus, a reduction of an electric power consumption of the air conditioning apparatus is needed in order to increase a total mileage of the electric car per charging operation of the battery.

In order increase the efficiency of a refrigerating system for an air conditioning apparatus, a gas injection system (two stage compression-expansion system) has heretofore proposed, wherein a pressure of a refrigerant condensed at a condenser is reduced to an intermediate pressure, so as to obtain a gas-liquid combined state of the refrigerant, which is directed to a separator. The gaseous phase of the refrigerant separated at the separator is injected to a compression chamber in the compressor, while the liquid phase of the refrigerant separated at the separator is subjected to a second stage pressure reduction and is directed to an evaporator.

An increased efficiency of the gas injection system is obtained at a desired region of a rotating speed of the compressor. However, it is difficult to maintain the rotating speed of the compressor in the region providing such an increased efficiency since the rotating speed varies in accordance with the load of the air conditioning system. In other words, at a rotating speed outside the desired range, the efficiency of the gas injection system is reduced over that of a conventional single stage compression-expansion system.

Furthermore, a reduction in the efficiency of the gas injection system occurs due to a over-compression phenomenon when the compressor is of a scroll type. Namely, in such a scroll compressor, an injection port is opened to an operating chamber during a period of a compression cycle, while the operating chamber is disconnected from an outlet port of the compressor. Thus, a situation may occur that the refrigerant at the operating chamber during the gas injection phase is excessively compressed over a compression ratio at the total compression system, which is the ratio of the outlet pressure to the inlet pressure of the compressor. This is especially the case when the system is under a low load condition, where the compression ratio of the system is low.

SUMMARY OF THE INVENTION

An object of the present invention is to provide a refrigerating system capable of overcoming the above mentioned difficulty in the prior art.

Another object of the present invention is to provide a refrigerating system capable of obtaining an increased efficiency of the system across the entire range of the operating condition.

Still another object of the present invention is to provide a refrigerating system of a gas injection type capable of preventing an occurrence of an over-compression phenomenon.

According to the invention claimed in claim 1, the gas injection system is provided with means for controlling a gas injection in accordance with the operating condition of the refrigerating system. As a result, an increased efficiency of the refrigerating system is obtained over a wide range of operating conditions.

According to the invention in claims 2 and 4, the gas injection system is provided with means for controlling a pressure difference between the pressure at the outlet of the gas-liquid separator and the inlet of the evaporator in accordance with the load. An increased pressure difference during a high load condition allows gas injection to be executed, while a reduced pressure difference during a low load condition prevents the gas injection from being executed. As a result, a desirable switching is done between the gas injection operation (two stage compression-expansion system) and the single stage compression-expansion operation in accordance with the load. Thus, an increased efficiency is obtained across the entire range of the operating condition.

In the invention as claimed in claims 3 and 8, a control valve is provided on a gas injection conduit for controlling an amount of injected gas. Namely, a gas injection amount is reduced during a low load condition, which prevents an over-compression state from occurring during a low load condition. As a result, an increased efficiency is obtained over a wide range of loads on the air conditioning system.

BRIEF EXPLANATION OF ATTACHED DRAWINGS

DESCRIPTION OF PREFERRED EMBODIMENTS

Figure 1:
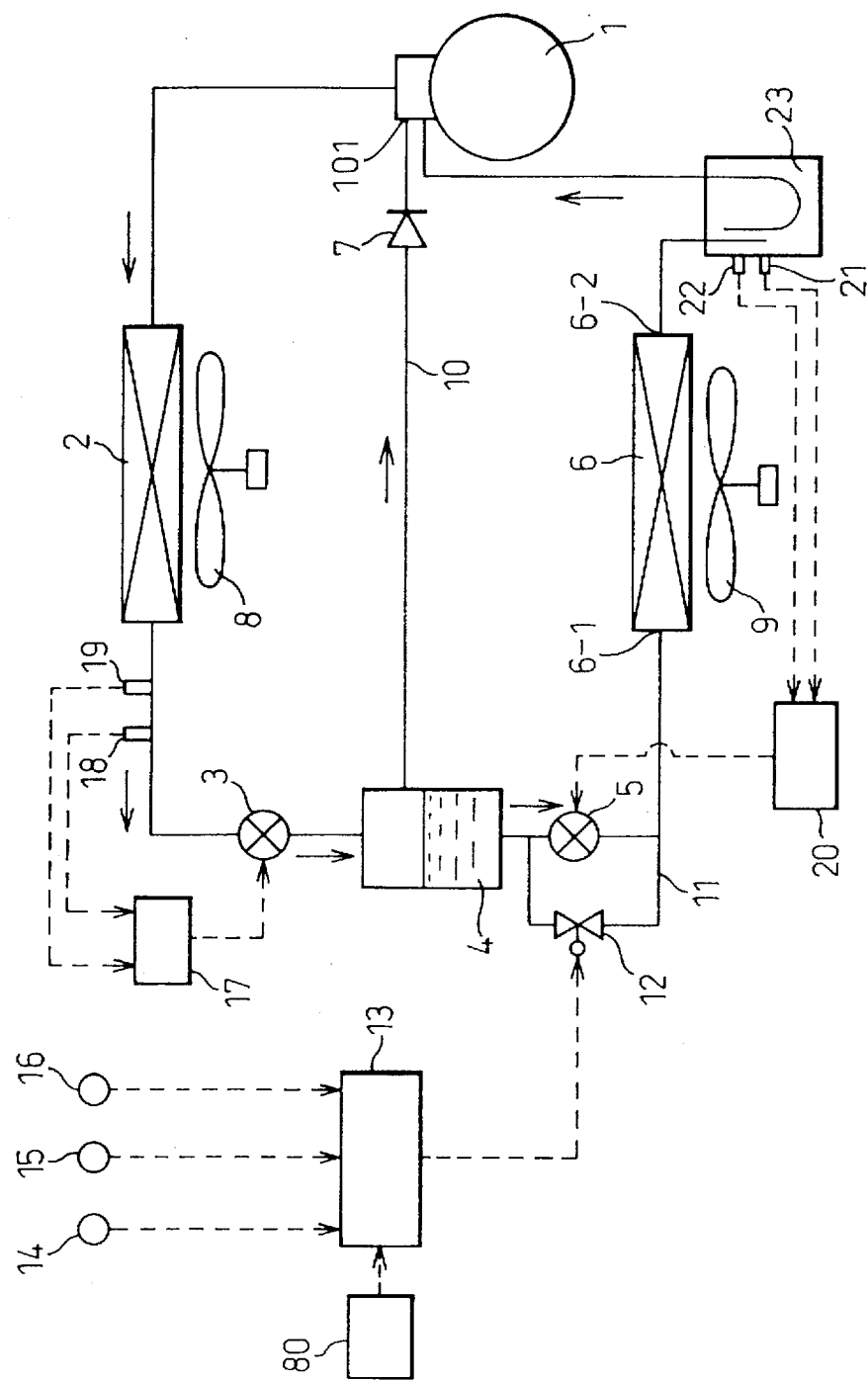
FIG. 1 is a diagrammatic view of a refrigerating system according to an embodiment of the present invention directed to a first aspect of ON-OFF operation of a gas injection in accordance with an air conditioning load.

Now, embodiments of the present invention will be explained with reference to the attached drawings. A first embodiment is directed to a feature of an ON-OFF control of a gas injection operation in accordance with an air conditioning load. FIG. 1 shows a refrigerating system executing a refrigerating cycle for an air conditioning apparatus suitable for an electric car. In the refrigerating system, a reference numeral 1 denotes a compressor for compression of the refrigerant of a construction of a desired type such as a scroll type or a rolling piston type. The compressor 1 is in connection with a rotating source such as an electric motor (not shown) of an electric car. Connected to the compressor 1 is a condenser (outside heat exchanger) 2 for condensing the refrigerant. An outside fan 8 is arranged for generating a flow of an outside air, so that a heat exchange occurs between the refrigerant in the condenser 2 and the air flow, thereby promoting the heat exchange. The condenser 2 is connected to a first stage pressure reducer 3, so as to obtain a gas-liquid combined state of the refrigerant, which is under a pressure intermediate between an intake pressure at the inlet of the compressor 1 and an outlet pressure at the outlet of the compressor. The gas-liquid combined state refrigerant is introduced into a gas-liquid separator 4, whereat a phase separation of the combined gas occurs. The separated liquid state refrigerant is subjected to a second stage pressure reduction at a second stage pressure reducer 5. The refrigerant at reduced pressure from the second stage pressure reducer 5 is directed to an inside heat exchanger (evaporator) 6, whereat the refrigerant is evaporated, and is introduced into the compressor 1. An inside fan 9 for generating a flow of an inside air for an air conditioning of the cabin is arranged to face with the evaporator 6, so that a heat exchange occurs between the refrigerant in the evaporator 6 and the inside air flow. The refrigerant after the heat exchange is returned to the compressor 1 for the repetition of the refrigerating cycle. The gaseous state refrigerant separated at the evaporator 4 is, via injection passageway 10 and a check valve 7, directed into an injection port 101 of the compressor, from where the injection of the gas to the compressor 1 is occurred.

Figure 2:
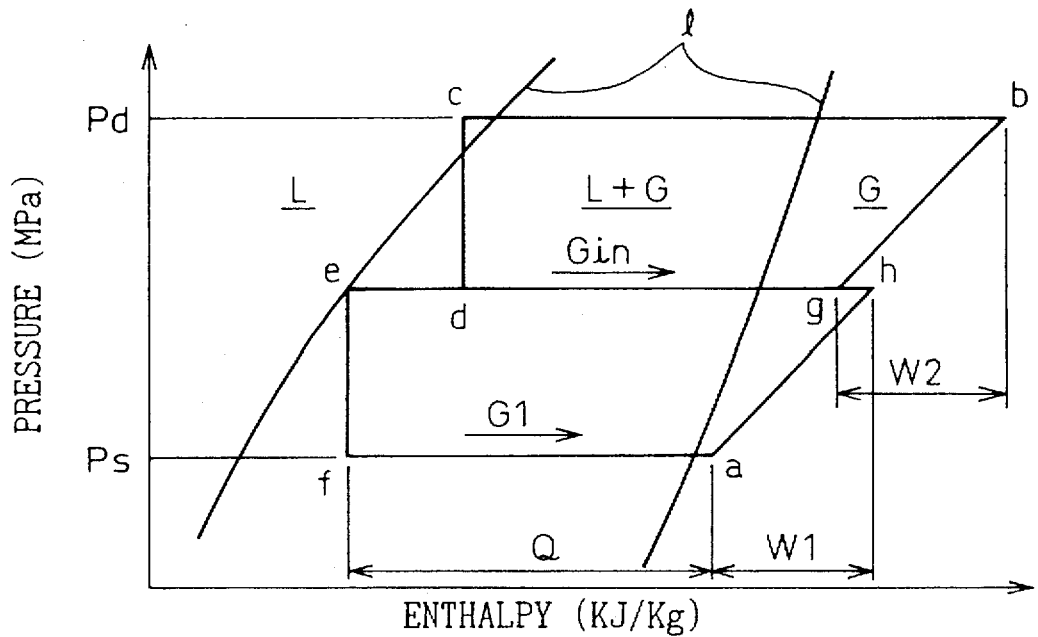
FIG. 2 is a relationship between an enthalpy and a pressure in a refrigerating system of a gas injection type (two stage compression-expansion system).

In FIG. 2, showing a Mollier chart of the gas injection system, the abscissa is enthalpy, while the ordinate is pressure. A saturated vapor line is shown by l, at the inside of which the refrigerant is under a gas-liquid combined state L+G. During the compression phase by the compressor 1, the pressure is increased from a point a to a point b at a gaseous state region G outside the saturated vapor line. During the condensation by the condenser 2, the pressure is maintained unchanged, while the enthalpy is reduced from the point b to a point c, which is located at a liquid state region L outside the saturated vapor line l. A pressure drop from the point c to point d occurs at the first pressure reducer 3. The liquidization at the gas-liquid separator 4 is designated by a change of the state from the point d to a point e on the line l. A pressure drop from the point e to point f, which is the gas-liquid mixed state L+M, is occurred at the second pressure reducer 5. During an evaporation process at the evaporator 6, a change in the enthalpy from the point f to the point a occurs, where the pressure is unchanged. Due to the gas injection operation, the gaseous state refrigerant from the gas-liquid separator 4 is introduced into the compressor 1 via the conduit 10 and the check valve 7. This process is illustrated by a state of change from the point d to g in FIG. 2. Namely, due to the gas injection, the enthalpy at the point h obtained by the first state compression is reduced to that at the point g.

The above construction of the gas injection system for executing a gas injection cycle is the same as that in the prior art. A coefficient of performance of such a gas injection system can be theoretically calculated in the following way. Namely, the refrigerating effect by the execution of the gas injection cycle is determined by a specific enthalpy difference between the inlet 6-1 and the outlet 6-2 of the inside heat exchanger (evaporator) 6, which is expressed by the Q in FIG. 2, multiplied by the mass flow rate G1 (kg/cm) of the refrigerant passed through the inside heat exchanger, that is Q×G1. On the other hand, work for compression by the compressor 1 is expressed by a sum of the compression work at the first and second stage compression. Namely, the compression work during the first stage compression is the specific enthalpy difference W1 (FIG. 1) due to the compression, multiplied by the mass flow rate G1, that is W1×G1. Contrary to this, a work for a compression at the second stage compression is the specific enthalpy difference W2 due to the compression, multiplied by the mass flow rate G1, that is W2×G1, plus the specific enthalpy difference W2 due to the compression multiplied the injection mass flow rate Gin, that is W2(G1×Gin). Thus, the coefficient of a performance at the gas injection cycle, which is a ratio of the refrigerating effect to the compression $$\frac{Q \times G1}{W1 \times G1 + W2(G1 + Gin)}.$$

Figure 3:
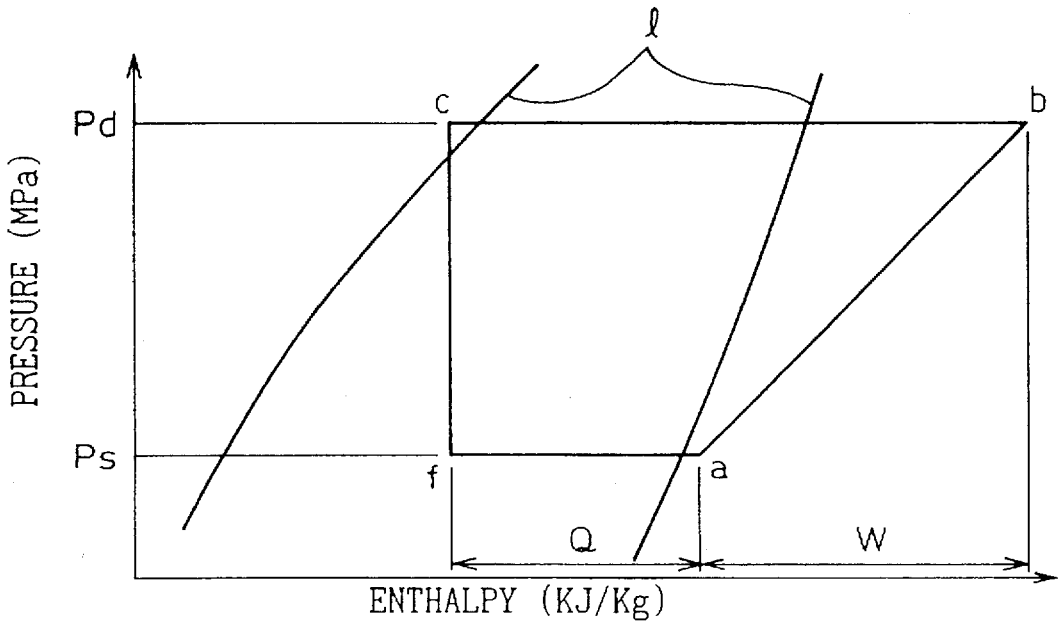
FIG. 3 is a relationship between an enthalpy and a pressure in a refrigerating system of a single stage compression-expansion system.

FIG. 3 shows a Mollier chart for a usual single-compression refrigerating system where only a single stage compression/expansion between the points a and b occurs, while only a single stage pressure reduction is also occurred between the points c and f. In this case, the coefficient of the performance is expressed by $$\frac{Q}{W},$$

which means that, if the compressor is of the same dimension, the gas injection system can provide an increased coefficient of performance over that of the conventional system. Furthermore, as will be clear from FIGS. 2 and 3, when the same value of the intake pressure Ps and the outlet pressure Pd are maintained, the gas injection system in FIG. 2 can obtain an increased value of the refrigerating effect Q per one rotation of the compressor over that of the single stage compression-expansion system in FIG. 3. As a result, it can be concluded that, in order to maintain an increased value of the coefficient of performance during the execution of the refrigerating cycle, the gas injection system in FIG. 2 is superior to the single stage compression-expansion in FIG. 3.

Figure 4:
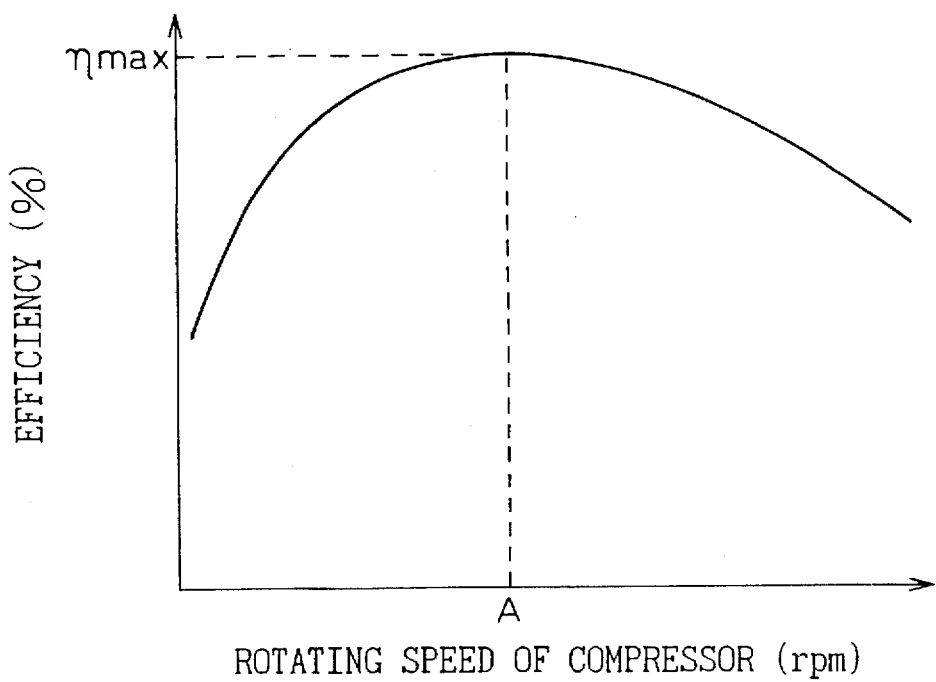
FIG. 4 is a relationship between a rotational speed of the compressor and an efficiency.

In FIG. 4, the abscissa shows a rotating speed of the compressor, while ordinate shows the efficiency of the compressor. As easily seen from a curve in FIG. 4, the relationship between the rotation speed and the efficiency is on a curve which projects upwardly. Namely, the maximum efficiency $\eta$max is obtained at a predetermined rotational speed A. In other words, when the compressor is operated at the predetermined rotational speed A, the maximum performance of the compressor is obtained. However, it is usual that an air conditioning system is operated with a wide range of loads from a low load operation to a high load operation. Thus, it is practically impossible to maintain the predetermined rotational speed A in FIG. 4, which can provide the maximum efficiency. Namely, during a high load condition of the air conditioning system, which usually occurs during a winter or summer season, a high rotational speed of the compressor is needed in order to increase the refrigerating effect per unit of time. Contrary to this, during a low load condition of the air conditioning system, which usually occurs during a spring or autumn season, a low rotational speed of the compressor refrigeration order to decrease the refrigerating effect per unit of time. This is the reason that it is practically impossible to maintain the rotational speed of the compressor to the value A for obtaining the maximum efficiency.

A construction of the present invention capable of obtaining a desired high efficiency irrespective of the air conditioning load will be explained. In FIG. 1, a control unit 17 is provided for controlling the first stage pressure reducer 3. The control circuit 17 is supplied with signals from a temperature sensor 18 and a pressure sensor 19, which are arranged in a refrigerant recalculating passageway at a location adjacent the outlet of the condenser 2. Namely, at the outlet of the condenser 2, the temperature sensor 18 detects a temperature of the refrigerant while the pressure sensor 19 detects a pressure of the refrigerant. The operation of the control unit 17 is such that the first stage pressure reducer 3 is controlled in accordance with the detected temperature and the pressure at the outlet of the condenser 2, so that a degree of a super cooling of the refrigerant is controlled to a target value.

A by-pass passageway 11 is connected to the recirculating passageway so as to by-pass the second stage pressure reducer 5. A dimension of the by-pass passageway 11 is such that a pressure loss is substantially not generated when the refrigerant passes the passageway 11. Furthermore, an electromagnetic on-off valve 12 is arranged on the by-pass passageway 11. An electric control unit (ECU) 13 as a micro-computer unit is provided for obtaining the on-off control of the by-pass valve 12. Connected to the ECU 13 are sensors 14, 15 and 16. The sensor 14 is for detecting the temperature of the air outside the cabin. The sensor 15 is for detecting a sun radiation amount to the cabin. The sensor 16 is for detecting the temperature of the air inside the cabin. Furthermore, a temperature setter 80 is provided which is manipulated by an operator for setting a desired temperature of the cabin. Based on the signals from the sensors 14, 15 and 16 and the temperature setter 80, the control unit 13 effects a designated calculation for operating the electromagnetic valve 12.

Figure 5:
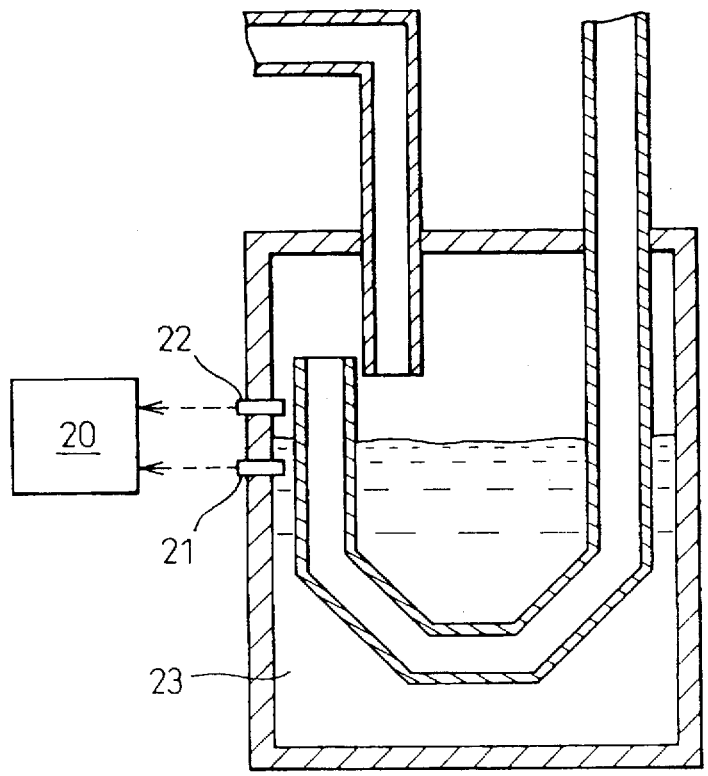
FIG. 5 is a cross sectional view of an accumulator in FIG. 1.

A control unit 20 is provided for controlling the second stage pressure reducer 5. The control circuit 20 is supplied with signals from level sensors 21 and 22 for detecting levels of liquid state refrigerant in the accumulator 23. These level sensors 21 and 22 are connected to the accumulator 23 as shown in FIG. 5. The control unit 20 generates a signal for operating the second stage pressure reducer 5 so that the level of the liquid state refrigerant in the accumulator 23 is controlled to within the desired range.

The accumulator 23 is arranged between the evaporator 6 and the compressor 1. At the accumulator 23, a gaseous phase is separated from the refrigerant. The separated gaseous phase of the refrigerant is introduced into the compressor 1 for repetition of the refrigerating cycle. The accumulator 23 also functions to temporarily store the liquid phase of the refrigerant.

The injection port 101 of compressor 1 may have a desired construction capable of injecting the gasses refrigerant into a compression chamber (not shown) of the compressor. Namely, the compressor may be a scroll type as is disclosed in Japanese Unexamined Patent Publication No. 4-321786, wherein it has a stationary scroll member having a pair of injection ports opened to respective compression chambers. The present invention can also be applied to a compressor of a rolling piston type as disclosed in a Japanese Unexamined Patent Publication No. 7-110167 having two compression chambers.

Now, an operation of the present invention will be explained. An operation of the control unit 13 for operating the electromagnetic valve 12 will be explained with reference to a flow chart in FIG. 6. At step 100, output signals from the outside air temperature sensor 14, the sun radiation amount sensor 15 and the inside air temperature sensor 16 are read out. At step 110, based on the read out values of the outside air temperature, the sun radiation amount and the inside air temperature, a calculation of the target cooling capacity $W_c$ is done. In this case, the target cooling capacity $W_c$ corresponds to a cooling capacity which is needed to cool the cabin so that the temperature inside the cabin is equal to the set temperature at the setter 80 manipulated by a driver or passenger, i.e., the work (refrigerating capacity) to be done by the refrigerating system.

At step 120, a calculation of a reference cooling capacity $W_{ci}$ done in accordance with the capacities of the various components constructing the air conditioning apparatus. The reference cooling capacity $W_{ci}$ is calculated in the following way. Namely, the cooling capacity of the air conditioning apparatus is roughly proportional to the rotating speed of the compressor 1. Thus, larger the rotating speed, larger the cooling capacity. Contrary to this, the maximum efficiency $\eta$max of the compressor is obtained at a predetermined rotating speed A as explained with reference to FIG. 4. Namely, a reduction of the efficiency of the compressor 1 occurs at the rotating speed other than the predetermined rotating speed $\underline{A}$. Thus, as shown by a solid curve $\underline{C}$ in FIG. 7 which illustrates relationships between the cooling capacity and the coefficient of the performance of a gas injection system, the maximum value of the coefficient of performance is obtained at a value of the cooling capacity Wcmax, which corresponds to the predetermined rotational speed A of the compressor in FIG. 4. This means that a reduction in the coefficient of performance occurs at a cooling capacity other than that providing the maximum coefficient of performance, as shown by FIG. 7.

Figure 7:
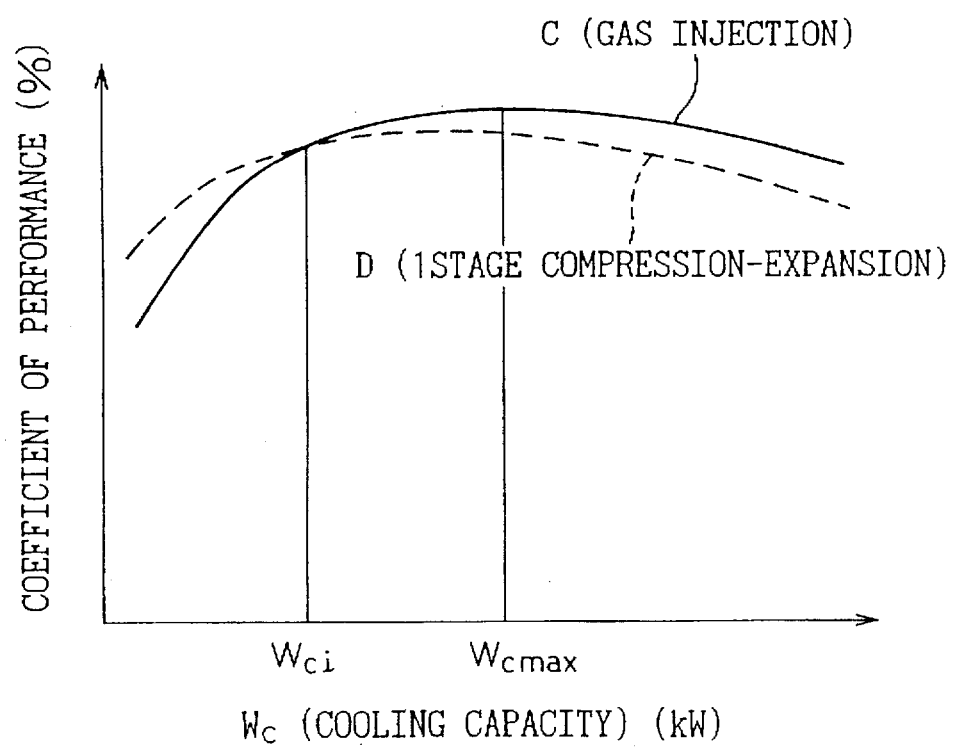
FIG. 7 shows relationships between a cooling ability and a coefficient of performance.

In FIG. 7, a dotted curve $\underline{D}$ shows a relationship between the cooling capacity and the coefficient of performance a conventional one stage compression-expansion. It should be noted that, in FIG. 7, for both of the curve C for the gas injection cycle and the curve D for the conventional one stage compression-expansion, capacities of parts constructing the refrigerating system such as the compressor, the condenser and the evaporator et al. were maintained the same. As will be clear from FIG. 7, the curves $\underline{C}$ for the gas injection system and the curve $\underline{D}$ for the single stage compression cross at a point which corresponds to a value of the cooling capacity, $W_{ci}$. Namely, at the region of the cooling capacity $W_c$ lower than this value $W_{ci}$, the coefficient of the performance of the single stage compression-expansion system $\underline{D}$ is higher than that of the gas injection cycle $\underline{C}$. Contrary to this, at the region of the cooling capacity $W_c$ higher than this value $W_{ci}$, the coefficient of the performance of the gas injection cycle C is higher than that of the single stage compression $\underline{D}$. The reference cooling capacity $W_{ci}$ is the value of the cooling capacity where the curves C and D cross, i.e., the value of the coefficient of the performance is equal between the gas injection system (C) and the single stage compression (D).

Figure 6:
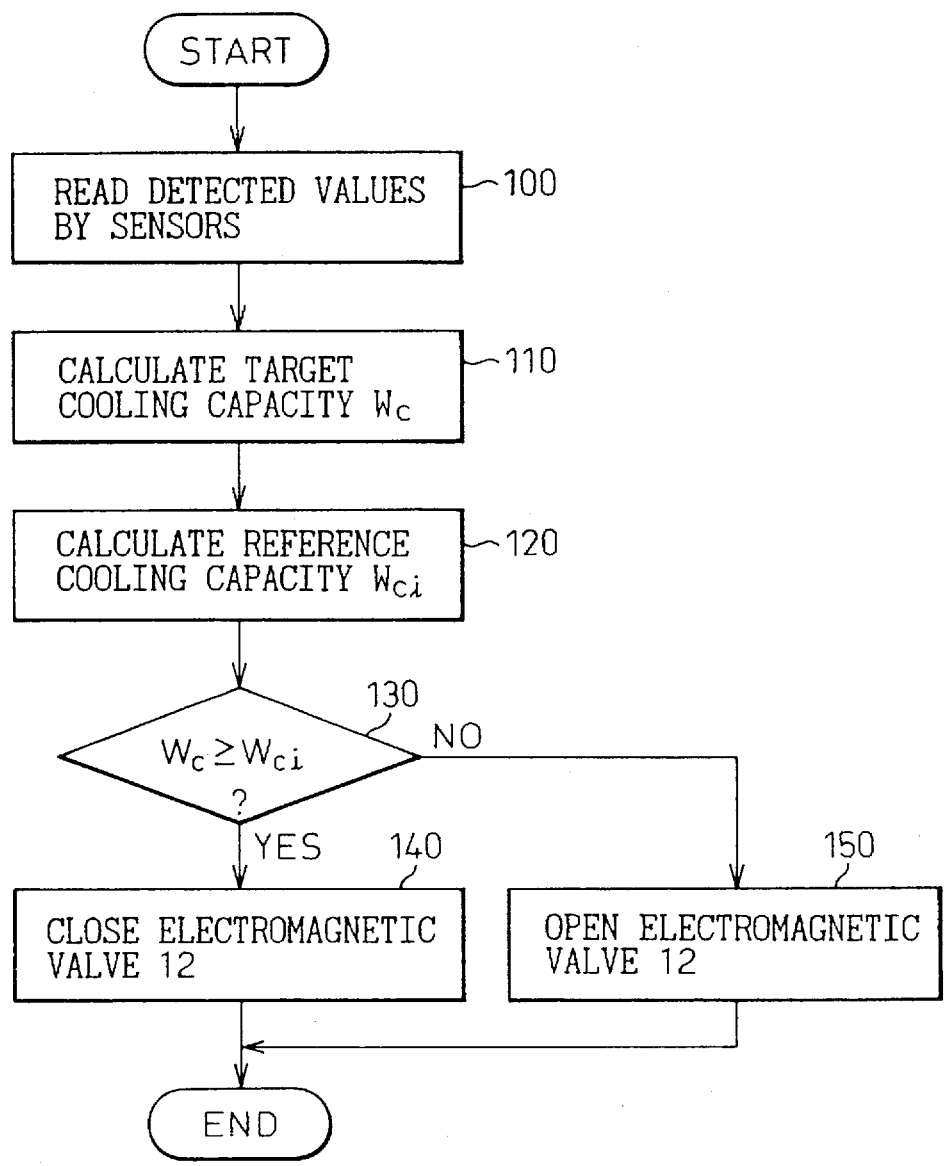
FIG. 6 is a flow chart illustrating a gas injection operation in the first embodiment.

Returning to the flow chart in FIG. 6, at step 130, it is determined if the target cooling capacity $W_c$ is equal to or larger than the reference value $W_{ci}$. When it is determined that target cooling capacity $W_{ci}$ is equal to or larger than the reference value $W_{ci}$, the routine goes to step 140, where the control unit 13 issues a signal to cause electromagnetic valve 12 to close. As a result, the gas injection cycle is executed. Namely, the liquid state refrigerant separated at the gas-liquid separator 4 is introduced into the second stage pressure reducer 5, while the gaseous state refrigerant at the separator 4 is, via the conduit 10 and the check valve 7, directed into the injection port 101, from where the gaseous state refrigerant is injected into the compression chamber of the compressor. As a result, in the region where $W_c \geq W_{cin}$, i.e., in the region where the efficiency of the gas injection system $\underline{C}$ is larger the that of the single stage compression-expansion $\underline{D}$, the gas injection system is selected.

Contrary to this, when it is determined that target cooling capacity $W_c$ is smaller than the target cooling capacity $W_{ci}$ at the step 130, the routine goes to step 150, where the control unit 13 issues a signal to cause electromagnetic valve 12 to open. The opened condition of the valve 12 causes the pressure to be equalized between the gas-liquid separator 4 and the evaporator 6. As a result, across the injection port 101, the pressure of the refrigerant at the compressor 1 is higher than the pressure of the refrigerant at the gas-liquid separator 4, which urges the refrigerant in the operating chamber of the compressor to flow toward the gas-liquid separator 4. However, the provision of the check valve 7 prevents such a flow of the refrigerant from occurring. Furthermore, the refrigerant from the separator 4 flows through the by-pass passageway 11 into the evaporator 6 without generating any pressure loss in the passageway 11. The stoppage of the gas injection from the injection port 101 causes the refrigerant in the gas-liquid separator 4 to be in an agitated condition, which prevents the refrigerant from being subjected to a gas-liquid separating operation in the gas-liquid separator 4. As a result, a flow of refrigerant under the gas-liquid combined state is introduced into the by-pass passageway 11. Thus, the opened condition of the electromagnetic valve 12 causes the system to operate so as to execute the single stage compression-expansion operation. In short, in the region where $W_c < W_{cin}$, i.e., in the region where the efficiency of the single stage compression-expansion system D is lager than that of the gas injection system $\underline{C}$, the single stage compression-expansion is selected.

As explained above, according to the operation of the present invention, a target cooling capacity $W_c$ smaller than the reference cooling capacity $W_{cin}$ causes the refrigerating system to execute the single stage compression/expansion operation, while a target cooling capacity $W_c$ equal to or larger than the reference cooling capacity $W_{cin}$, causes the refrigerating system to operate to execute the gas injection cycle. As a result, an increased efficiency is obtained across a wide range of cooling capacities.

Furthermore, according to the present invention, switching between the gas injection system and the single stage compression/expansion system is executed by merely switching the electromagnetic valve 12 between the ON and OFF conditions. As a result, the system can be simplified, thereby reducing a production cost, while keeping an increased efficiency.

Furthermore, the system according to the present invention is simplified by merely adding, to an existing gas injection system, the by-pass conduit 11 and the electromagnetic valve 12.

Figure 8:
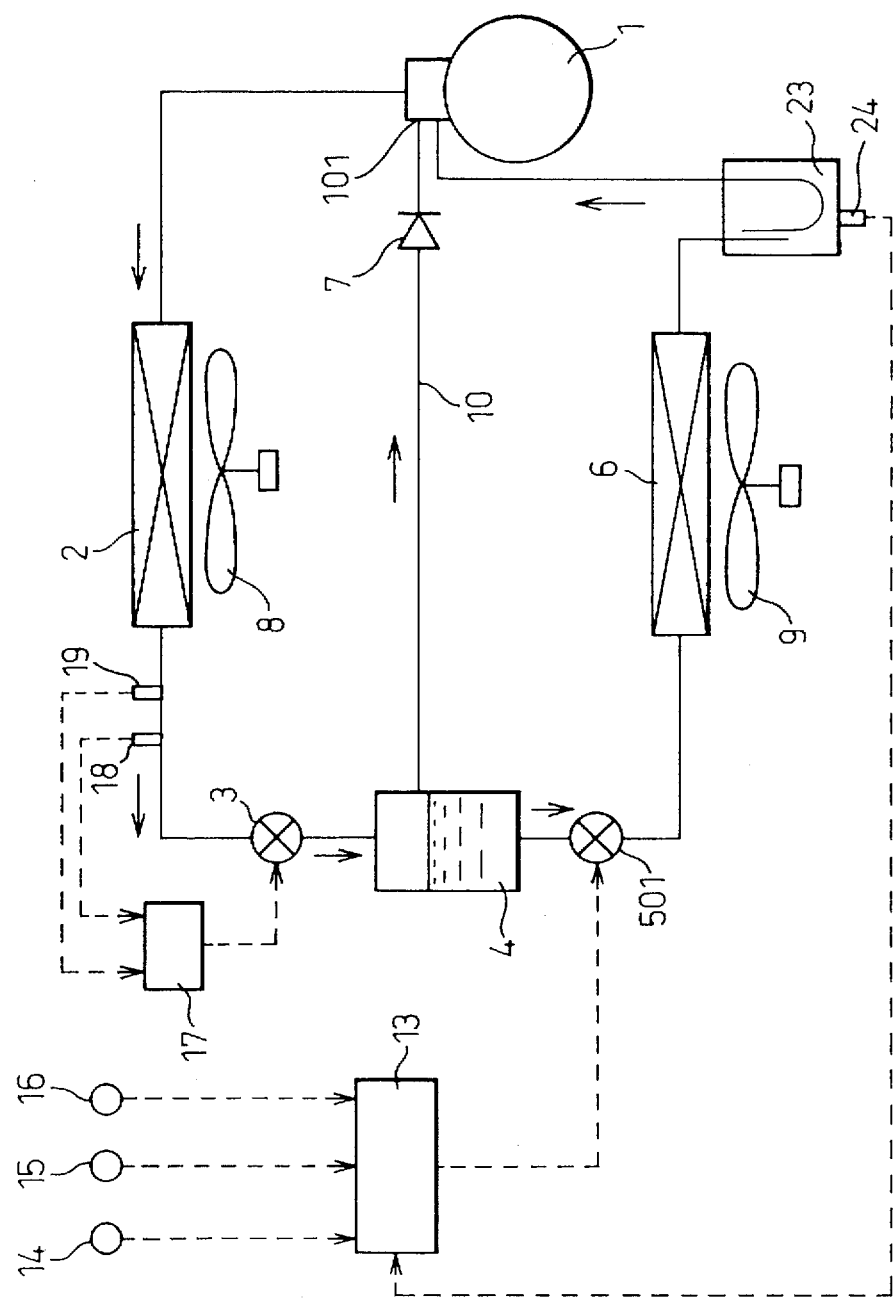
FIG. 8 is a diagrammatic view of a refrigerating system in a modification of the system in FIG. 1.

FIG. 8 shows a modification of the embodiment in FIG. 1, wherein, in place of the pressure reducer 5 at a lower pressure side, the electromagnetic valve 12 and the by-pass passageway 11 in FIG. 1, a control valve of a proportional type 501 is used, which can effect a step-less control of a degree of an opening of the orifice from a no pressure loss state to a fully closed state. Namely, in order to effect the step-less control of the degree of the opening, the control valve 501 is connected to a control unit 13. The control unit 13 effects a desired calculation in accordance with the signals from the outside air temperature sensor 14, the sun radiation sensor 15 and the inside air temperature sensor 16, so that a signal is issued from the control unit 13 to the valve 501 for controlling the degree of the opening of the valve 501. The operation of the control unit 13 is similar to that of the embodiment as explained with reference to the flow chart in FIG. 6. Namely, the target cooling capacity $W_c$, and the reference cooling capacity $W_{ci}$ are compared to determine which one of the gas injection operation and the single stage compression/expansion operation provides a larger value of the coefficient of performance. A determination that the target cooling capacity $W_c$, is larger than the reference cooling capacity $W_{ci}$ causes the control valve 501 to be operated to provided a throttled passageway so that a gas injection operation is carried out at the compressor 1. Contrary to this, a determination that the target cooling capacity $W_c$, is smaller than the reference cooling capacity $W_{ci}$ causes the control valve 501 to be operated to provided a fully opened passageway so that a gas injection operation is stopped, i.e., a single stage compression/expansion is done at the compressor 1.

Figure 9:
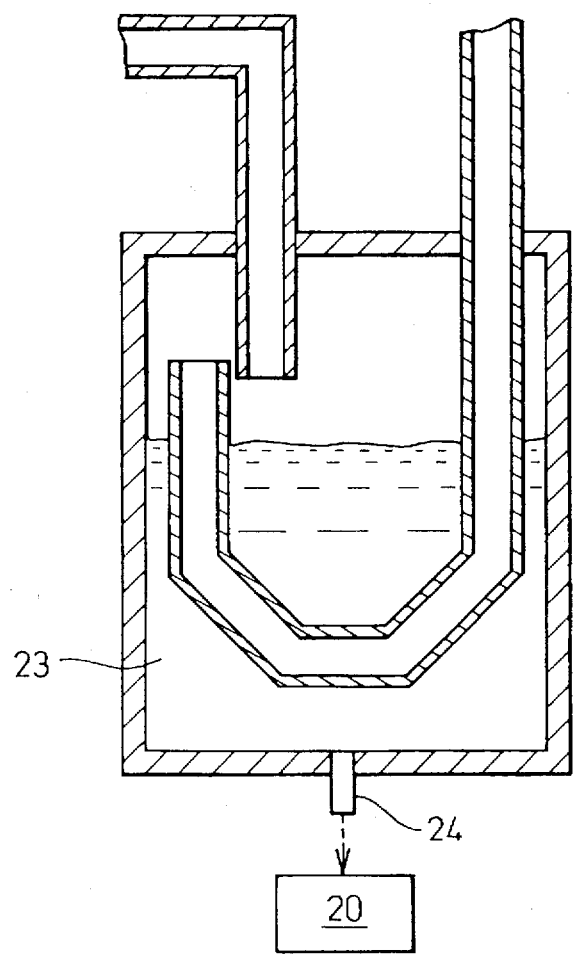
FIG. 9 is a cross-sectional view of an accumulator in FIG. 8.

Furthermore, the embodiment in FIG. 8 is different from the embodiment in FIG. 1 in that a level sensor 24 of an ultrasonic type is used. Namely, as shown in FIG. 9, the sensor 24 is connected to the accumulator 23 at its bottom portion. The level of the liquid state refrigerant in the accumulator 23 is detected by the ultrasonic type level sensor 24 so that a signal indicating the level is issued to the control circuit 13.

As a result, an amount of the liquid state refrigerant in the accumulator 23 is suitably controlled.

A further modification will be illustrated with reference to FIGS. 10 and 11. This embodiment features a compressor 300 in which a function of an accumulator is incorporated. Namely, as shown in FIG. 11, the compressor 300 comprises a compressor section 311 and an electric motor section 312. The latter section 312 includes a housing 313, an upright rotating shaft 314, which is connected to the compressor section 311, an armature 315 on the rotating shaft 314, and a stator 316 fixedly connected to the housing 313. Inside the housing 313, a chamber 317 is formed which is in communication with the conduit from the evaporator 6, which causes the refrigerant to be introduced into the chamber 317, as shown by an arrow f, after being subjected to evaporation at the evaporator 6, so that a liquid phase 318 of the refrigerant is stored at the bottom of the chamber 317 as shown in FIG. 11. Thus, the chamber 317 functions as an accumulator for separating the gaseous phase of the refrigerant which is sucked by the compressor section 311 and discharged to the condenser 2 as shown by an arrow g in FIG. 10.

Figure 10:
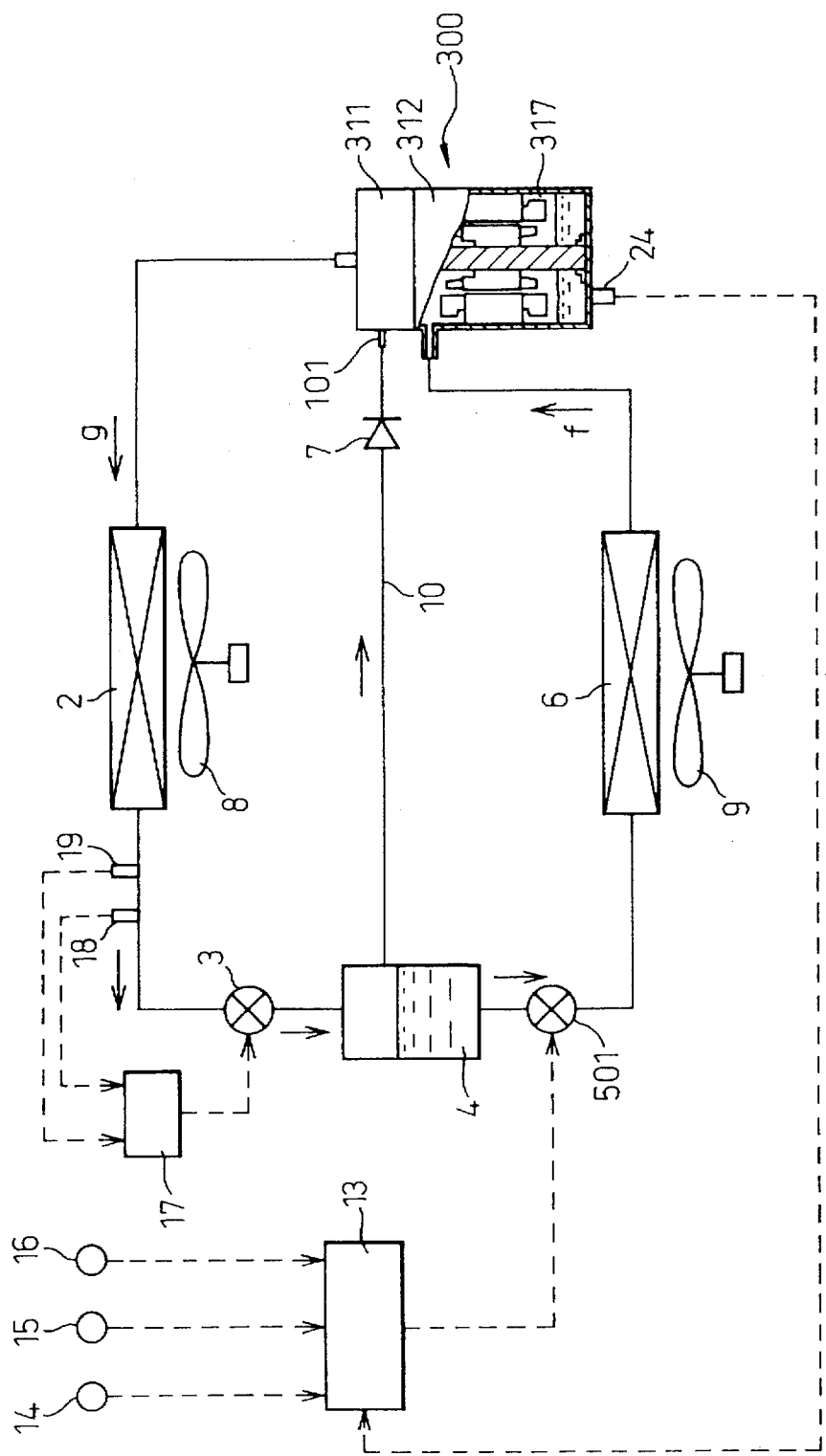
FIG. 10 is a diagrammatic view of a refrigerating system in another modification.
Figure 11:
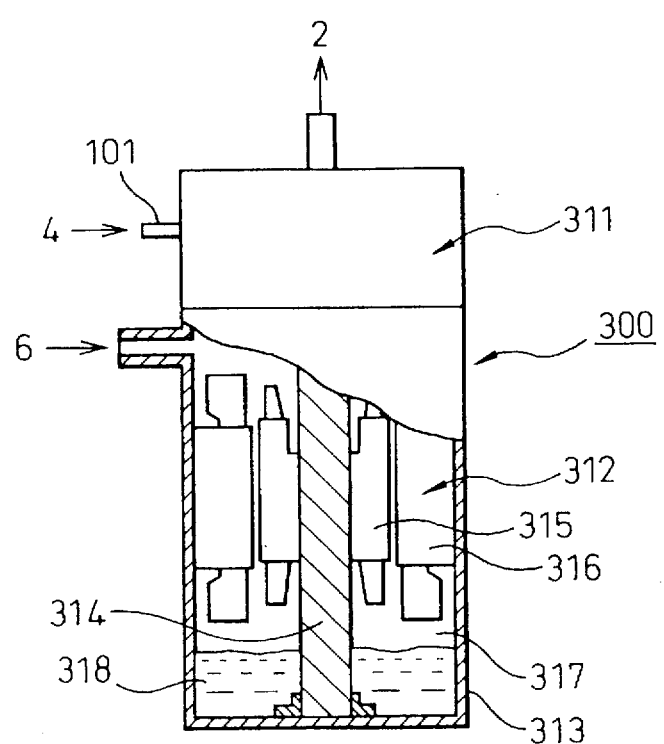
FIG. 11 is a cross sectional view of a compressor in FIG. 10.

As will be understood from the above explanation, in the embodiment in FIGS. 10 and 11, a function of an accumulator is incorporated in the compressor 300. Thus, a provision of a separate accumulator as well as piping and connectors can be eliminated and the work for assembling the parts is simplified, thereby reducing a production cost of the system for executing the refrigerating cycle.

Figure 12:
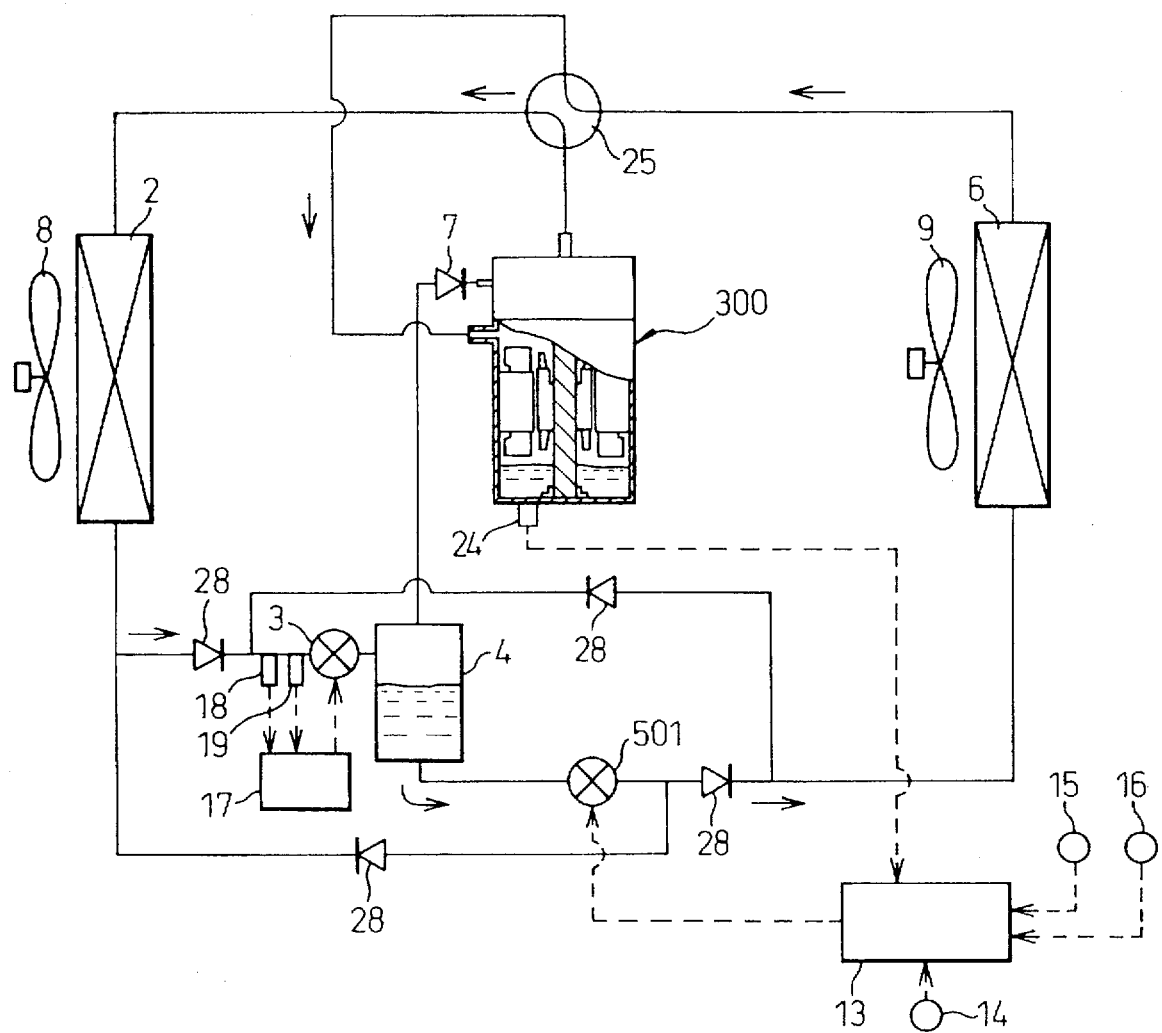
FIG. 12 is a diagrammatic view of a refrigerating system in a further another modification.
Figure 13:
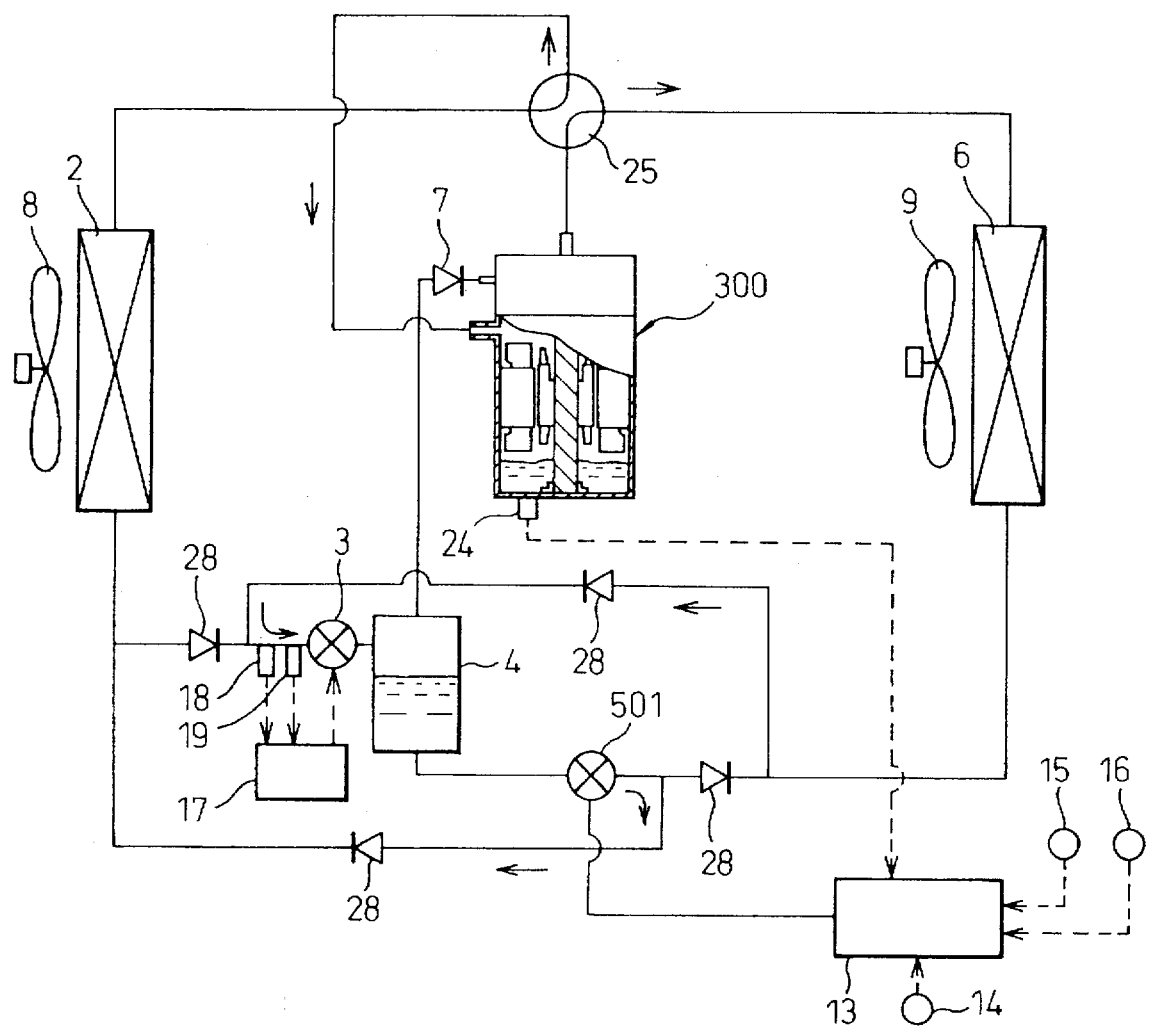
FIG. 13 is the same as FIG. 12 except that a switching valve is in a different position.

FIG. 12 shows a further modification, wherein an idea of the present invention is realized in a so-called heat pump system, wherein a reversible operation is obtained between a heating operation and a cooling operation. In FIG. 12, a four port two directional switching valve 25, which rotates between a first position as shown in FIG. 12 and a second position as shown in FIG. 13, and four check valves 28 are provided. The arrangement of the check valves 28 is such that, in the first position (a cooler position), a recirculation of the refrigerant occurs as shown by arrows in FIG. 12 in the order of the compressor 300, the outside heat exchanger 2 functioning as a condenser, the first stage pressure reducer 3, the gas-liquid separator 4, the second stage pressure reducer 501 of a proportional type, the inside heat exchanger 6 functioning as an evaporator, and, in the second position (a heater position), a recirculation of the refrigerant occurs as shown by arrows in FIG. 13 in the order of the compressor 300, the inside heat exchanger 6 functioning as a condenser, the first stage pressure reducer 3, the gas-liquid separator 4, the second stage pressure reducer 501, the outside heat exchanger 2 functioning as an evaporator 26 and the compressor 300.

In the operation of the fourth embodiment, the position of the switching valve 25 as shown in FIG. 12 allows the system to operate as a cooler where the outside heat exchanger 2 functions as a condenser for emitting the heat to the atmosphere, while the inside heat exchanger 6 functions as an evaporator for removing the heat from the cabin. Contrary to this, the position of the switching valve 25 as shown in FIG. 13 allows the system to operate as a heater where the inside heat exchanger 6 functions as a condenser for emitting the heat to the cabin, while the outside heat exchanger 6 heat exchanger 6 functions as an evaporator for removing the heat from the atmosphere. The operation of the proportional type control valve 501 by the control circuit 13 in accordance with the signals from the sensors 14 to 16 is similar to those in the second and third embodiments. As a result, in both of the cooling and the heating operation, a high efficiency refrigerating system is obtained.

Figure 14:
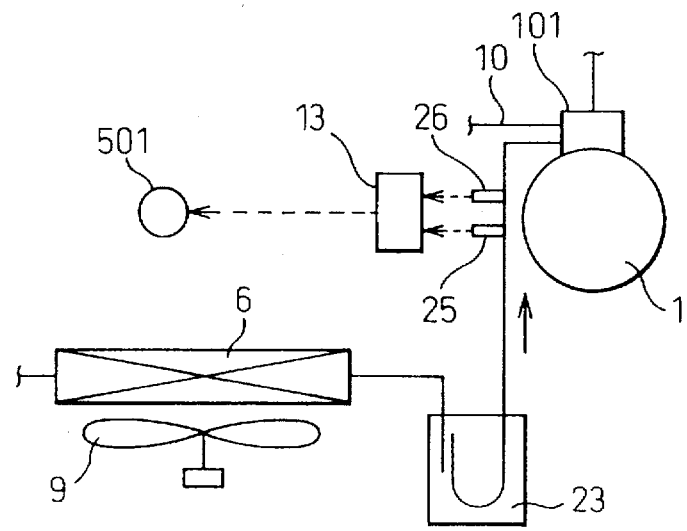
FIG. 14 illustrates a means for measuring a degree of overheating of the refrigerant at the outlet of an evaporator in still another modification.

In the above embodiments, control of the second stage pressure reducer 5 (FIG. 1) or the proportional type control valve 501 (FIG. 8) may be such that the degree of a superheating at the outlet of the evaporator 6 is controlled to a predetermined value. An embodiment in FIG. 14 is directed to detection of a level of the liquid state refrigerant in the accumulator 23. Namely, in place of a detection of the liquid level by the liquid level sensors 21 and 21 in FIG. 1, sensors 25 and 26 are provided. Namely, at the inlet of the compressor 1, the sensor 25 is provided for detecting a temperature of the refrigerant and the sensor 26 is provided for detecting a pressure of the refrigerant. It should be noted that the degree of superheating can also be detected by a conventional thermo-sensitive tube.

In the above embodiments, comparison is done between the reference cooling capacity $W_{ci}$, determined by signals from the various sensors and the target cooling capacity $W_c$. As an alternative, a rotating speed of the compressor is detected, which is compared with a predetermined rotating speed corresponding to the reference cooling capacity. As a result of the compression, control of the electromagnetic valve 12 or the proportional control valve 501 is done. Namely, when a detected rotating speed is higher than the predetermined rotating speed, a gas injection operation is executed. Contrary to this, when a detected rotating speed is lower than the predetermined rotating speed, a gas injection operation is stopped, i.e., a usual one-stage compression-expansion operation is executed.

In place of a comparison of a target cooling capacity as calculated by sensing values with the reference cooling capacity, a comparison of the enthalpy difference between the inlet and outlet with the reference cooling capacity is done in order to determine if the control of the pressure difference is necessary. It should be noted that such an enthalpy difference between the inlet and the outlet of the evaporator is calculated from the pressure difference between the inlet and the outlet of the evaporator.

Figure 15:
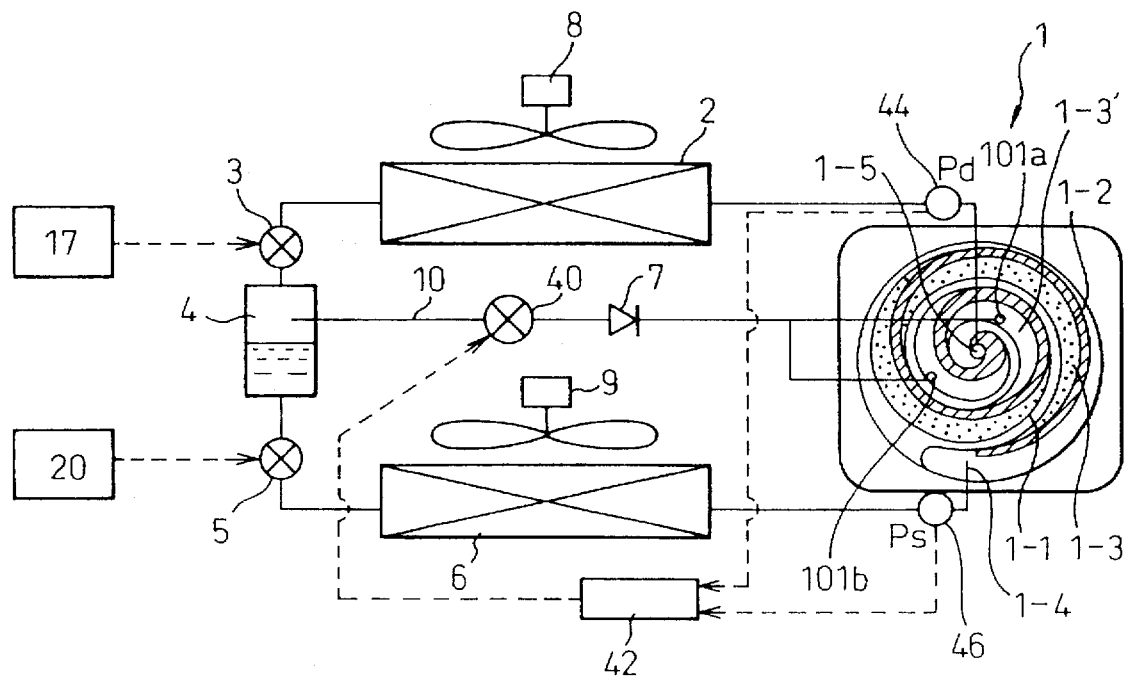
FIG. 15 is a diagrammatic view of a refrigerating system in another embodiment of the present invention directed to an aspect for preventing an over-compression.

FIG. 15 shows an embodiment of the present invention, which is directed to an aspect of an elimination of over-compression in the gas injection system using a scroll compressor. In a known manner, the scroll compressor 1 includes a stationary scroll member 1-1 and a movable scroll member 1-2 which is in connection with a rotating movement source of a vehicle, such as an electric car. Operating chambers 1-3 (compression chambers), which are moved radially inward during the rotating movement of the movable scroll member 1-2, are formed between the scroll members 1-1 and 1-2. The scroll compressor 1 includes, further, an intake port 1-4 opened to a operating chamber 1-3 located radially outwardly for receiving a gaseous state refrigerant of low pressure from the evaporator 6, and an exhaust port 1-5 opened to an operating chamber located radially inwardly for discharging a gaseous state refrigerant of a high pressure to the condenser 2. The compressor further includes a pair of diametrically opposite injection ports 101a and 101b, which are opened to operating chambers 1-3' located in a predetermined range of radial positions between the outermost and innermost positions. The injection ports 101a and 101b are in connection with the gas-liquid separator 4, so that the gaseous state refrigerant separated at the separator 4 is injected, via the check valve 7, as explained with reference to the first embodiment in FIG. 1.

Figure 16A:
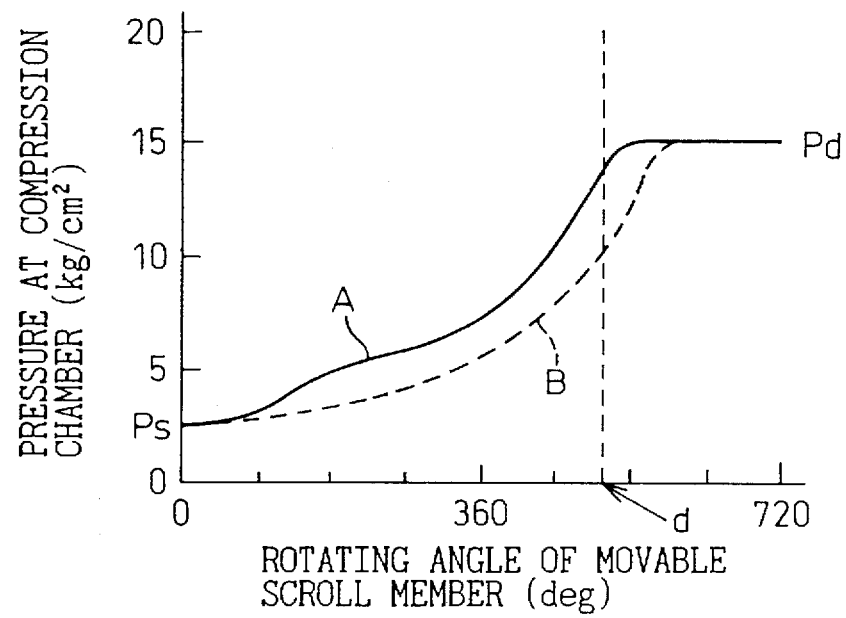
FIG. 16A is a relationship between a rotating angle of a movable scroll member of a scroll compressor and a pressure inside a compression chamber during large compression ratio compression.
Figure 16B:
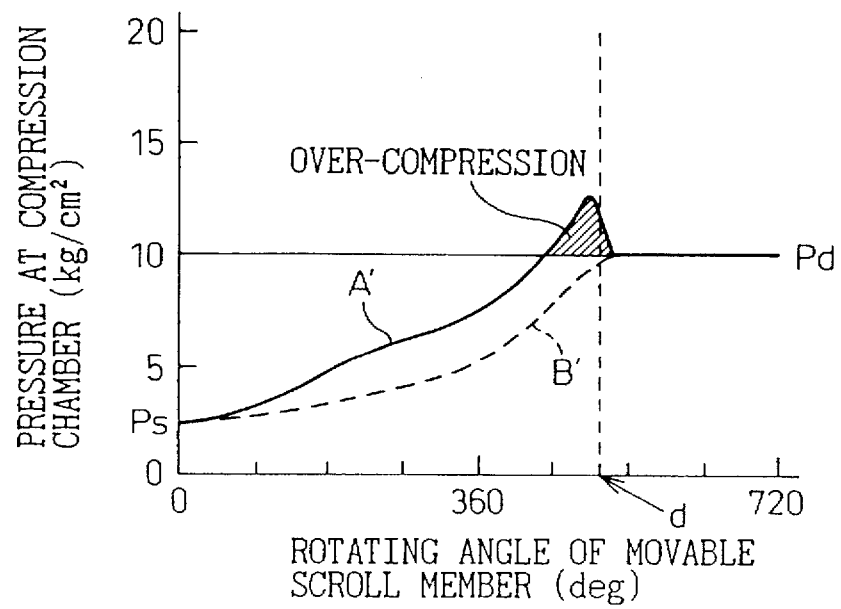
FIG. 16B is a similar relationship during small compression ratio compression.
Figure 17:
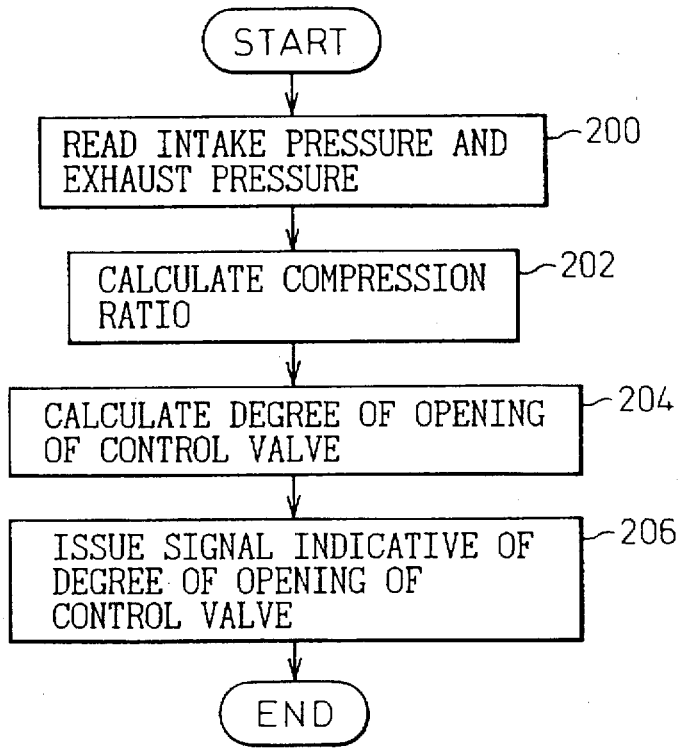
FIG. 17 is a flow chart illustrating an operation of the embodiment in FIG. 15.

Now, a problem to be solved by the instant embodiment will be explained. As shown in FIG. 15, the operating chambers 1-3', located on a radial position intermediate between the outermost and the innermost position, are separated from the outlet port 1-5. This construction may cause an over compression to be generated when a compression ratio is small, which is the ratio of the pressure Pd at the outlet port 1-5 to the pressure Ps at the inlet port 1-4. In FIGS. 16A and 16B, an abscissa shows a rotating angle of the movable scroll member 1-2, while an ordinate shows a pressure of the refrigerant in the operating chamber (compression chamber). In FIG. 16A, a curve A shows a relationship between the rotating angle and the pressure, when a value of the compression ratio is high, while, in FIG. 16B, a curve A' shows a similar relationship when a value of the compression ratio is low. In FIGS. 16A and 16B, curves B and B' show similar curves when a gas injection is not done, i.e., the single stage compression/expansion system is employed.

When the compression ratio is high, a smooth increase in the pressure at the compression chamber 1-3 from an intake pressure Ps to an outlet pressure Pd is, as shown by the curve A in FIG. 16A, obtained across the entire range of the rotating angle of 720° during a compression cycle of the movable scroll member. In other words, over-compression state does not occur when the compression ratio is high. Contrary to this, when the compression ratio is low, a state where the pressure at the compression chamber is higher than the outlet pressure, i.e., an over-compression state is likely appeared at a rotating angle area adjacent the rotating angle d whereat the compression chamber comes to open to the outlet port 1-5, as shown by the curve A' in FIG. 16B. Such an over compression state is caused by a cycle to cycle variation in an actual compression ratio, which is itself inevitable. Namely, due to such an increased variation, a situation may occur that an actual value of the compression ratio is smaller than an inner compression ratio, which is calculated from a geometry of the scroll members 1-1 and 1-2 as a ratio of the maximum volume of the compression chamber 1-3 upon the commencement of the intake stroke to the volume of the compression chamber 1-3 when a communication of the latter with the outlet port 1-5 is commenced, which is occurs at the rotating angle d in FIG. 16B. Due to such an over-compression, unnecessary compression work is done, thereby reducing the efficiency of the refrigerating system.

In order to solve this problem, in the embodiment in FIG. 15, a control valve 40 is provided on the conduit 10 for connecting the separator 4 with the injection ports 101a and 101b. The control valve 40 is for obtaining a stepless control of the gas injection amount into the operating chamber 1-3. A control unit 42 is provided for generating a operating signal for the control valve 40. A sensor 44 is arranged at the outlet of the compressor to issue an electric signal, indicating an outlet pressure Pd, which is introduced into the control unit 42. A sensor 46 is arranged at the inlet of the compressor for issuing an electric signal, indicating an intake pressure Ps, which is introduced into the control signal. The control constructed as a microcomputer.

Now, in an operation of the system in FIG. 15, the high pressure refrigerant from the outlet port 1-5 of the scroll compressor is introduced into the condenser 2, whereat the refrigerant is gasified, and is subjected to a first stage pressure reduction at the pressure reducer 3. The refrigerant is introduced into the separator 4 whereat a phase separation occurs. A liquid state refrigerant in the separator 4 is subject to a pressure reduction at the second pressure reducer 5 and is introduced into the evaporator to evaporate the refrigerant, which is introduced into the operating chambers 1-3 via the inlet port 1-4. The gaseous state refrigerant in the separator 4 is, via the control valve 40 and the check valve 7, introduced, via the injection ports 101a and 101b, into the compression chambers 1-3, which are in a middle stage of the compression process.

In the scroll compressor, a reduction of a thermal load during the execution of the refrigerating cycle causes the compression pressure to be correspondingly reduced in the operating chamber 1-3 in order to obtain a heat balance, thereby causing a compression ratio to be reduced, which is a ratio of the outlet pressure Pd to the inlet pressure Ps. On the other hand, the employment of the gas injection system may causes an over-compression phenomenon to be generated during the low comparison ratio operation, such that the pressure at the operating chamber during the compression is higher than the outlet pressure Pd, which causes the efficiency to be worsened.

Figure 18:
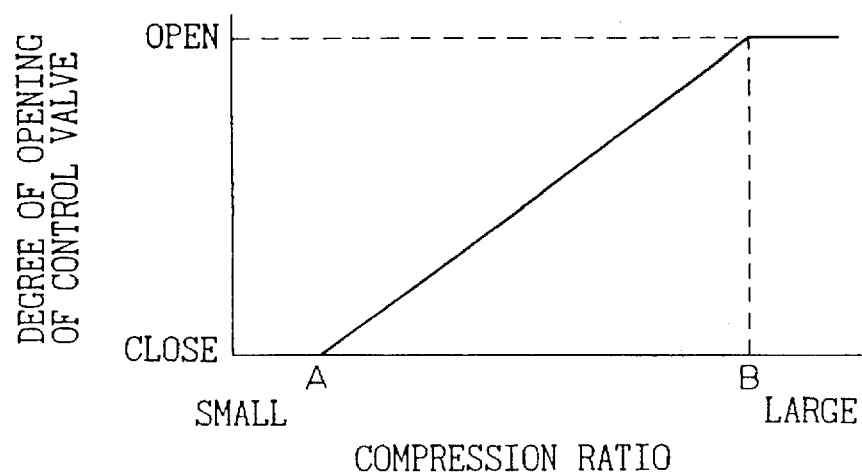
FIG. 18 is a relationship between a compression ratio and a degree of opening of a control valve on an injection conduit.

Now, an operation of this embodiment will be explained with reference to a flowchart in FIG. 16. At step 200, an exhaust pressure Pd and the intake pressure Ps, detected by the pressure sensors 44 and 46, are read out. At step 202, a ratio of the detected exhaust pressure Pd to the detected intake pressure Ps, which is referred as a compression ratio, is calculated. At step 204, a degree of opening of the control valve 40 is calculated in accordance with the compression ratio as calculated at the step 204. Namely, FIG. 18 shows a relationship between the compression ratio and the degree of the opening of the control valve 40. This relationship is in a form of a map stored in a memory of the control unit 42. Namely, a well known map interpolation calculation is done for calculating a value of the degree of the opening of the control valve 40 corresponding to the calculated compression ratio. At step 206, a signal is issued, from the control unit 42, to the control valve 40 to cause the latter to take the degree of opening calculated at the step 204.

A map used at the step 204 in FIG. 16 corresponds to a relationship between the compression ratio Pd/Ps and the degree of the opening of the control valve 40. As shown in FIG. 18, the control valve 40 begins its opening at a first predetermined value A of the compression ratio, and, then, increases along a straight line in accordance with the increase in the compression ratio. At a second predetermined value B of the compression ratio, the control valve 40 attains its full opening. The first and second predetermined values A and B are determined in accordance with a value of a so-called internal compression ratio, which is based on shapes of the scroll members 1-1 and 1-2 and which is calculated as a ratio of the maximum volume of the compression chamber 1-3 as obtained when an induction of the gas to the compression chamber is just commenced, to the minimum volume of the compression chamber 1-3 as obtained when the compression chamber 1-3 communicates with the outlet port 1-5. The first predetermined value A is usually determined so that it is equal to or slightly larger than the value of the above mentioned internal compression ratio. The first predetermined value is for example 4.0. The second predetermined value B has a value which is larger than the first predetermined value. The second predetermined value is for example 5.0.

In FIG. 18, an over-compression is not generated at a region of the compression ratio larger than the second value B. Thus, in this region of the compression ratio, the full degree of the opening of the control valve 40 is maintained, so that the maximum value of the injection amount is obtained, while obtaining an increased efficiency of the refrigerating system. Contrary to this, a reduction of the compression ratio from the second value B causes the control valve 40 to be reduced, so that the injection amount is correspondingly reduced. When the compression ratio is reduced to a value smaller than the first predetermined value A, which is equal to or slightly larger than the internal compression ratio, the control valve 40 is fully closed, so that the gas injection is stopped. In other words, the gas injection amount is zero.

In short, in the instant embodiment, control of the gas injection amount in accordance with the value of the compression ratio can provide an increased efficiency while preventing an over-compression phenomenon from occurring.

In the above embodiment, in order to calculate the actual compression ratio at the scroll compressor, the outlet pressure Pd and the intake pressure Ps are directly detected. In place of directly detecting values of these pressures Pd and Ps, an evaporation temperature of the refrigerant related to these values can be detected. Then, from the detected value of the evaporation temperature, an estimation of the pressures Pd and Ps is done and a calculation of the compression ratio is done.

Figure 19:
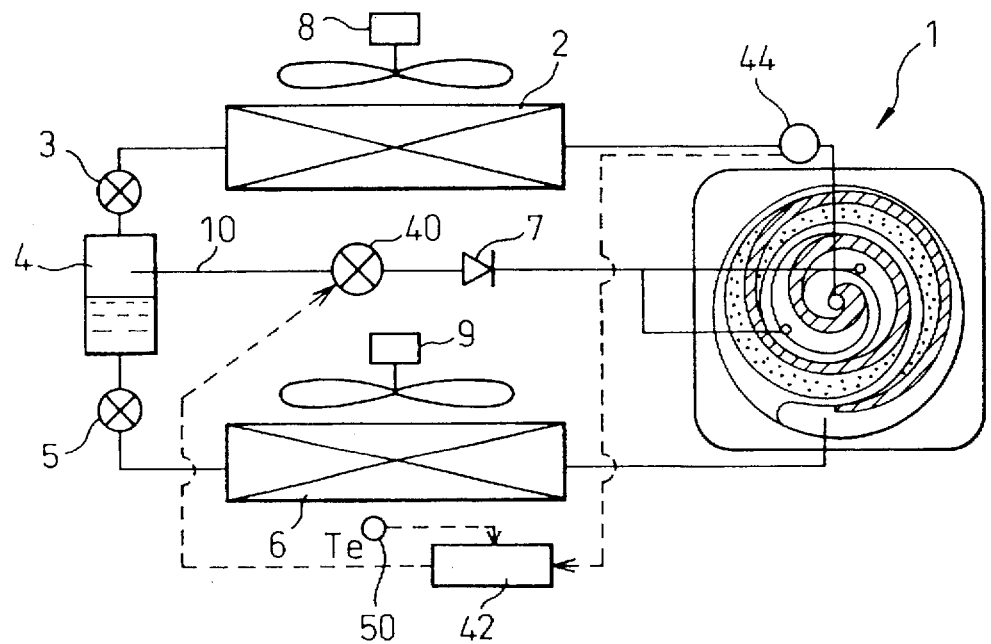
FIGS. 19 to 22 show, respectively, various modification of the embodiment in FIG. 15.

Furthermore, the intake pressure Ps in the scroll compressor is related to a degree of the cooling of the evaporator, i.e., the temperature of the air discharged from the evaporator. An embodiment in FIG. 19 uses this relationship for controlling the control valve 40. Namely, in this embodiment, in place of the intake pressure sensor 46 in FIG. 15, a temperature sensor 50 is arranged, so that it contacts the flow of air conditioning air after contacting the evaporator 6, so that a temperature Te of the air from the evaporator is detected. The signal, indicating the discharged air temperature Te, from the sensor 50 is introduced into the control unit 42, where a calculation of the pressure Pd at the outlet of the compressor 1 is done, which is used for controlling the control valve 40 for controlling the gas injection amount in accordance with the compression ratio, as explained with reference to the embodiment in FIG. 15. Namely, from the detected value of the discharged air temperature Te, a predetermined outlet pressure Pd0 is calculated. When the outlet pressure Pd as detected by the sensor 44 is reduced below a predetermined value Pd0, i.e., the compression ratio is reduced below a predetermined value, the control unit 42 controls the control valve 40 in such a manner that the gas injection amount is reduced, or the gas injection is stopped, thereby preventing over-compression.

Figure 20:
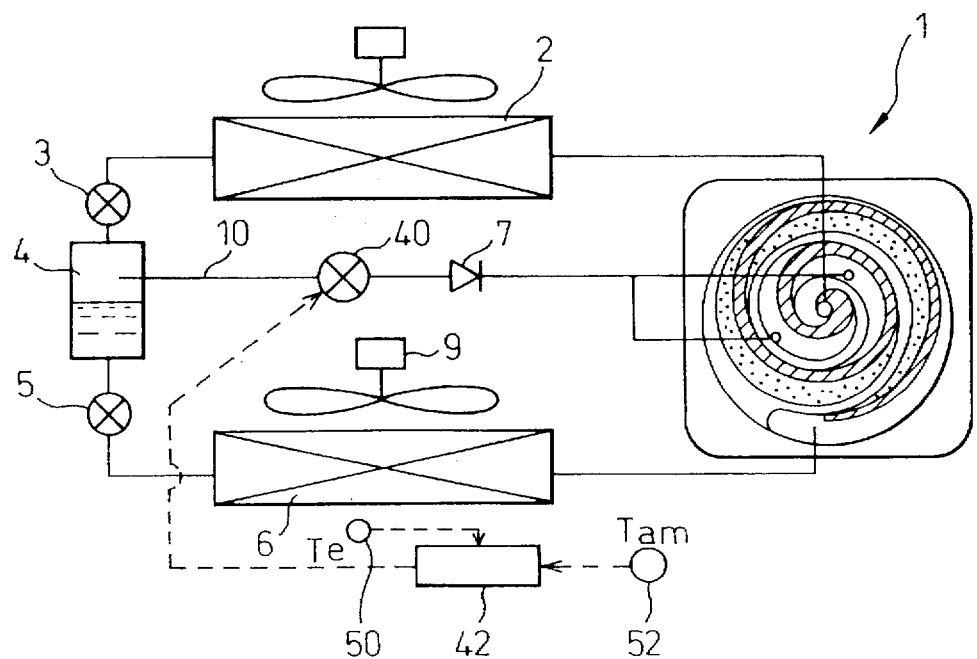

In a further modification in FIG. 20, in addition to a sensor 50, for detecting a temperature Te of air discharged from the evaporator 6, and a sensor 54, for detecting a temperature Tam of air outside the cabin, are provided. In other words, neither of the intake pressure nor the outlet pressure is detected. The outlet pressure Pd from the compressor 1 is related to the outside air temperature Tam. From the discharged air temperature Te, a threshold value Tam0 of the outside air temperature is determined. When the detected outside air temperature Tam is reduced below the threshold value Tam0, the control unit issues a signal directed to the control valve 40 in such a manner that the gas injection amount is reduced or the gas injection operation is stopped.

In the embodiment in FIG. 20, in place of setting the threshold value Tam0 of the outside air temperature, a difference between the outside air temperature Tam and the discharged air temperature Te is calculated. When this difference is smaller than a predetermined value, the gas injection amount is reduced or the gas injection is stopped.

Figure 21:
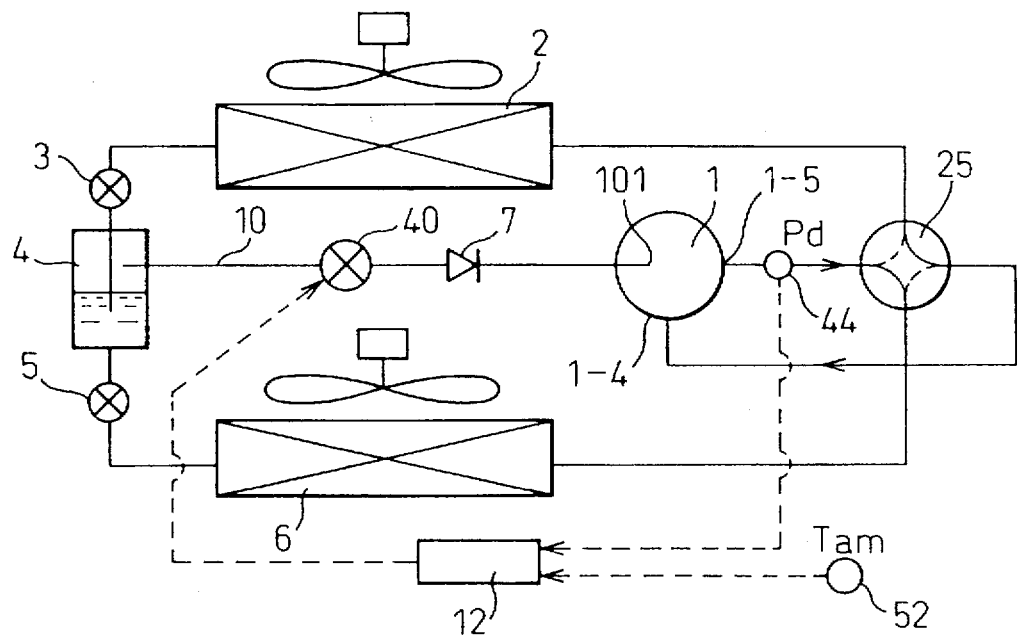

FIG. 21 shows an application of the idea of control of the gas injection amount in accordance with the compression ratio to a heat pump system as explained in detail with reference to the embodiment in FIG. 2. In FIG. 21, the switching valve 25 is in a position for obtaining a heating operation, where the compressed refrigerant from the outlet 1-5 of the compressor 1 is, first, introduced into the inside heat exchanger 6 functioning as a condenser. The condensed gas from the inside heat exchanger 6 is, via the separator 4 and the outside heat exchanger 2 functioning as an evaporator, returned to the inlet 1-4 of the compressor. A gas injection from the separator 4 to the compressor 1 is also done via the injection passageway 10. As already explained with reference to FIG. 12, during a cooling operation, the switching valve 25 is rotated so that a reverse flow from the outside heat exchanger 2 to the inside heat exchanger 6 occurs.

During the heating operation as shown in FIG. 21, the outside heat exchanger 2 executes a evaporating operation, where the refrigerant absorbs the heat from the outside air.

Thus, a relationship between the intake pressure Ps and the outside air temperature Tam exists. Thus, a sensor 52 is provided for detecting the outside air temperature Tam, from which a predetermined value Pd0 of a outlet pressure is calculated. When an actual outlet pressure Pd is detected by a sensor 44 provided at the outlet of the compressor 1, a control of the degree of the opening of the control valve 40 on the injection passageway 10 is done in such a manner that the gas injection amount is reduced or gas injection is stopped.

Figure 22:
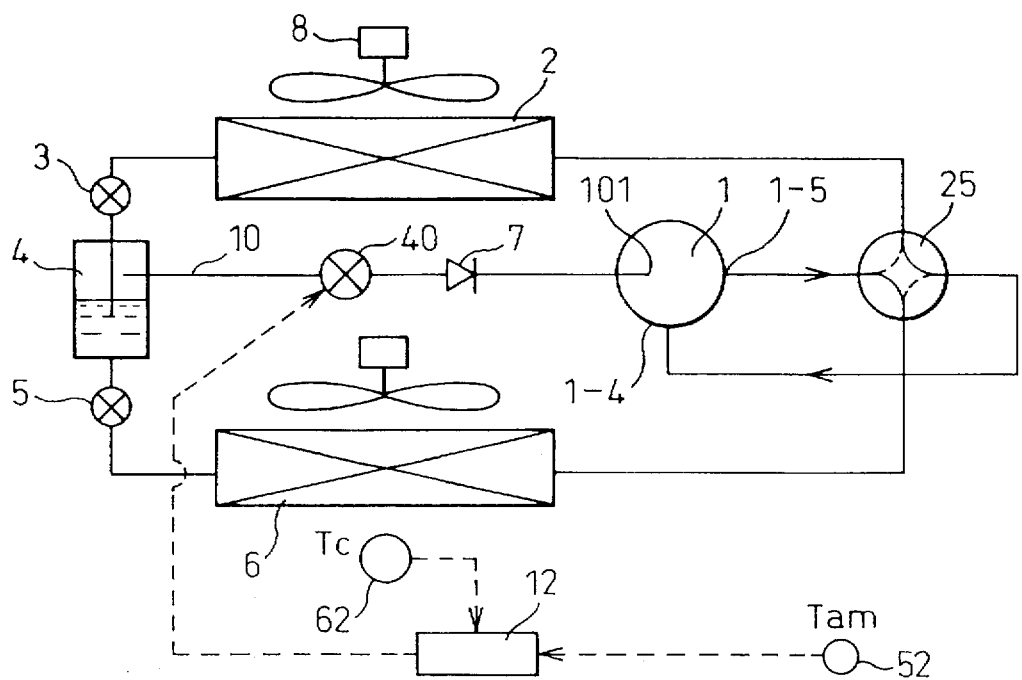

FIG. 22 shows a modification of an embodiment in FIG. 21. Namely, in FIG. 22, in place of the pressure sensor 44 at the outlet of the compressor 1, a temperature sensor 62 for detecting a temperature Tc of the air after contacting the inside heat exchanger 6. Namely, during the heating mode, wherein the switching valve 25 is located as shown in FIG. 22, a predetermined relationship exists between the degree of the heating at the heat exchanger 6 and the outlet pressure Pd at the outlet of the compressor 1.

In the operation of the system in FIG. 22, based on the outside air temperature Tam detected by the outside air temperature sensor 52, a predetermined value Tc0 of the temperature of the air after contacted with the inside heat exchanger 6 functioning as a condenser is calculated. When it is determined that the actual value Tc of the air after contacting the inside heat exchanger 6 is reduced below the predetermined value Tc0, a control of the degree of the opening of the flow control valve 40 is done in such a manner that the gas injection amount is reduced or the gas injection operation is stopped.

In the embodiment in FIG. 22, in place of setting the temperature of the air from the inside heat exchanger 6 to the predetermined value Tc0, a difference between the actual discharged air temperature Tc and the outside air temperature Tam may be calculated. When the difference is reduced below a predetermined value, the flow control valve 40 is operated in such a manner that the gas injection amount is reduced or the gas injection operation is stopped.

In the above embodiments of FIGS. 15 to 22, the control valve 40 is of a proportional type which can provide continuous control of a flow amount of the injection gas. However, the control valve 40 may be an on-off type valve, and a duty ratio control is employed so that a ratio of duration of the ON operation during a period of one cycle of the operating signal is varied, whereby a continuously varied gas injection amount is obtained in accordance with the detected compression ratio as shown by the curve in FIG. 18.

In FIG. 18, between the full opening at the compression ratio larger than the first predetermined value A and the complete closing at the compression ratio smaller than the second predetermined value B, a continuously varied gas injection amount is obtained. In place of such a control, a two stage control is possible such that a full opening is obtained at a compression ratio larger than a predetermined value C intermediate between A and B, while a full closing is obtained at a compression ratio smaller than the predetermined value C.

Finally, the field of the application of the refrigerating system according to the present invention is not limited to the air conditioning apparatus for an automobile and may also be used in an air conditioning apparatus for a building.

We claim:

1. A refrigerating system comprising:
    a compressor for a refrigerant having a housing, a rotating shaft rotatable mounted to the housing and operating chambers in the housing, the volume of respective chambers being varied during a rotating movement of the shaft, an introduction of the refrigerant into the chamber being done during the increase of the volume of the operating chamber, a discharge of the refrigerant from the chamber being done during the decrease of the volume of the operating chamber;

a condenser for receiving the discharged gaseous refrigerant from the compressor;

a pressure reduction means for reducing a pressure of the refrigerant of the condensed refrigerant from the condenser to obtain a gas-liquid combined state of the refrigerant;

a gas-liquid separator for obtaining a gas-liquid phase separation of the combined state of the refrigerant;

an evaporator for evaporating the liquid state refrigerant separated at the separator, the evaporator being arranged to cool a medium to be cooled;

an injection means for injecting the gaseous state refrigerant in the separator into the operating chamber of the compressor which is under a compression stroke;

a check valve arranged between the separator and the injection means for preventing the refrigerant in the operating chamber from flowing back to the separator; and means, responsive to operating conditions of the refrigerating system, for controlling the gas injection operation for obtaining an increased efficiency of the system, wherein said gas injection control means comprises valve means for controlling an amount of the liquid state refrigerant flowing from the separator to the evaporator, and means responsive to the load of the refrigerating system for controlling the valve means for controlling a difference between the pressure at the outlet of said separator and inlet of the evaporator, so that the pressure difference is reduced during a low load condition for preventing the gaseous phase of the refrigerant from being injected by said injection means, while the pressure difference is increased during a high load condition for allowing the gaseous phase of the refrigerant to be injected by said injection means.

2. A refrigerating system comprising:

a compressor for a refrigerant having a housing, a rotating shaft rotatably mounted to the housing and operating chambers in the housing, the volume of the respective chambers being varied during a rotating movement of the shaft, an introduction of the refrigerant into the chamber being done during the increase of the volume of the operating chamber, a discharge of the refrigerant from the chamber being done during the decrease of the volume of the operating chamber;

a condenser for receiving the discharged gaseous refrigerant from the compressor;

a pressure reduction means for reducing a pressure of the refrigerant of the condensed refrigerant from the condenser to obtain a gas-liquid combined state of the refrigerant;

a gas-liquid separator for obtaining a gas-liquid phase separation of the combined state of the refrigerant;

an evaporator for evaporating the liquid state refrigerant separated at the separator, the evaporator being arranged to cool a medium to be cooled;

an injection means for injecting the gaseous state refrigerant in the separator into the operating chamber of the compressor which is under a compression stroke;

a check valve arranged between the separator and the injection means for preventing the refrigerant in the operating chamber from being reversed into the separator, and;

a control means for controlling a pressure difference between the outlet of the separator and the inlet of the evaporator in accordance with the load of the system.

3. A system according to claim 2, wherein the control means comprise a pressure difference control means for obtaining a selective switching between a pressure reduction condition where a pressure difference is generated between the outlet of the separator and the inlet of the evaporator for allowing the gas injection to be executed and a non-pressure-reduction condition where a pressure difference is substantially diminished between the outlet of the separator and the inlet of the evaporator for preventing the gas injection from being executed, means for detecting a load of the system and operating means for operating the pressure difference control means in such a manner the pressure-reduction condition is obtained during a high load condition of the system and the non-pressure-reduction condition is obtained during a low load condition.

4. A system according to claim 3, wherein said flow control means comprise a second pressure reduction means for reducing the pressure of the gaseous phase of the refrigerant separated at the separator, a by-pass conduit by-passing the second pressure reduction means and a valve means on the by-pass conduit for controlling a flow in the by-pass conduit, the valve means closing the by-pass condition for obtaining said pressure-reduction condition and opening the by-pass condition for obtaining said non-pressure-reduction condition.

5. A system according to claim 3, wherein said load detecting means comprise a sensor for detecting a rotating speed of the compressor, said operating means operating the pressure reduction means for obtaining the pressure reduction condition wherein the detected rotating speed is higher than a predetermined value, said operating means operating the pressure reduction means for obtaining the non pressure reduction condition wherein the detected rotating speed is lower than the predetermined value.

* * * * *